United States Patent
Cronin et al.

(10) Patent No.: US 9,080,655 B2
(45) Date of Patent: Jul. 14, 2015

(54) NO-LASH NUT ASSEMBLY

(75) Inventors: Patrick M. Cronin, Willoughby Hills, OH (US); Alexander Margolin, Solon, OH (US); Joseph H. Nook, Jr., Gates Mills, OH (US)

(73) Assignee: Nook Industries, Inc., Cleveland, OH (US)

( * ) Notice: Subject to any disclaimer, the term of this patent is extended or adjusted under 35 U.S.C. 154(b) by 283 days.

(21) Appl. No.: 13/552,159

(22) Filed: Jul. 18, 2012

(65) Prior Publication Data

US 2013/0019706 A1 Jan. 24, 2013

Related U.S. Application Data

(60) Provisional application No. 61/508,749, filed on Jul. 18, 2011.

(51) Int. Cl.
*F16H 55/18* (2006.01)
*F16H 25/20* (2006.01)

(52) U.S. Cl.
CPC .... *F16H 25/2006* (2013.01); *F16H 2025/2012* (2013.01); *Y10T 74/19902* (2015.01)

(58) Field of Classification Search
CPC ..... F16H 57/12; F16H 57/02; F16H 57/0006; F16H 2025/2012; F16H 25/2009; F16H 25/2006; F16H 55/24; F16H 55/18; F16H 2057/0213
USPC .............. 74/89.23, 89.3–89.35, 89.37, 89.39, 74/89.42, 409, 441, 440
See application file for complete search history.

(56) References Cited

U.S. PATENT DOCUMENTS

| | | | |
|---|---|---|---|
| 2,779,206 A | 1/1957 | Doerfner | |
| 3,656,358 A | 4/1972 | Kopp | |
| 4,131,031 A | 12/1978 | Erikson | |
| 4,353,264 A * | 10/1982 | Erikson et al. | 74/441 |
| RE31,713 E | 10/1984 | Erikson | |
| 4,594,039 A | 6/1986 | Witte | |
| RE32,433 E | 6/1987 | Erikson | |
| 4,872,795 A | 10/1989 | Davis | |

(Continued)

FOREIGN PATENT DOCUMENTS

GB 2272497 A 5/1994

OTHER PUBLICATIONS

International Search Report and Written Opinion of International Searching Authority in related Application No. PCT/US2012/047189, Dated Dec. 13, 2012.

*Primary Examiner* — David M Fenstermacher
(74) *Attorney, Agent, or Firm* — Calfee, Halter & Griswold LLP

(57) ABSTRACT

A no-lash nut assembly for installation on a threaded rod and including a lead nut, a trailing nut, a transition nut and a torsion spring. The lead and trailing nuts have threaded bores for mating with the rod. The trailing nut has an external surface configured for engagement with the lead nut to prohibit relative rotation and allow relative axial movement. The transition nut has a threaded bore for mating to trailing nut, an external surface defining a slot, and a front face having a mating surface corresponding to the rear face of the lead nut to allow relative axial movement between the lead nut and the transition nut. The torsion spring has a pin and a hook. The pin protrudes into the rear face of the lead nut and the hook protrudes into the transition nut slot to apply a rotational force on the transition nut.

18 Claims, 4 Drawing Sheets

(56) References Cited

U.S. PATENT DOCUMENTS

| | | |
|---|---|---|
| 4,954,032 A | 9/1990 | Morales |
| 4,974,464 A | 12/1990 | Erikson |
| 5,027,671 A | 7/1991 | Erikson |
| 5,125,280 A * | 6/1992 | Koscinski et al. ............. 74/89.4 |
| 5,303,606 A * | 4/1994 | Kokinda ........................ 74/441 |
| 5,839,321 A * | 11/1998 | Siemons ........................ 74/441 |
| 5,913,940 A * | 6/1999 | Erikson et al. ................. 74/441 |
| 6,585,469 B2 * | 7/2003 | Commins ..................... 411/536 |
| 7,516,582 B2 * | 4/2009 | Leek ............................ 52/223.1 |
| 7,841,251 B2 * | 11/2010 | Bogue .......................... 74/89.42 |
| 7,905,066 B2 * | 3/2011 | Pryor et al. ................. 52/223.14 |
| 7,992,456 B2 * | 8/2011 | Schroeder et al. ........... 74/89.39 |
| 2004/0250637 A1 * | 12/2004 | Hosokai et al. .............. 74/89.42 |
| 2005/0099004 A1 | 5/2005 | Bouey et al. |
| 2009/0145252 A1 * | 6/2009 | Schroeder et al. ........... 74/89.42 |
| 2013/0019706 A1 * | 1/2013 | Cronin et al. ................... 74/441 |

* cited by examiner

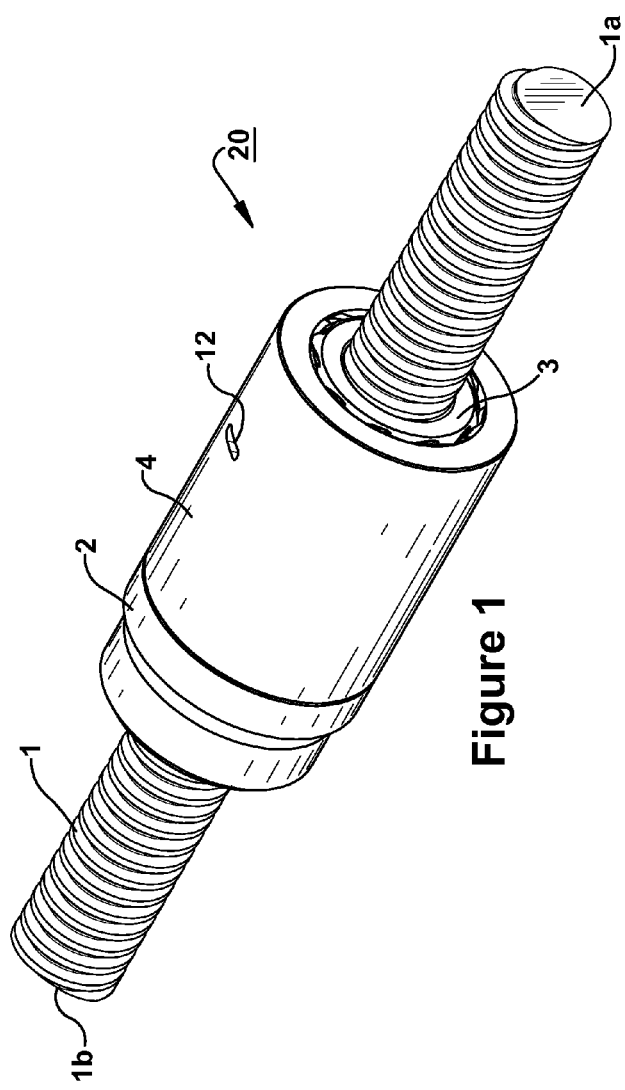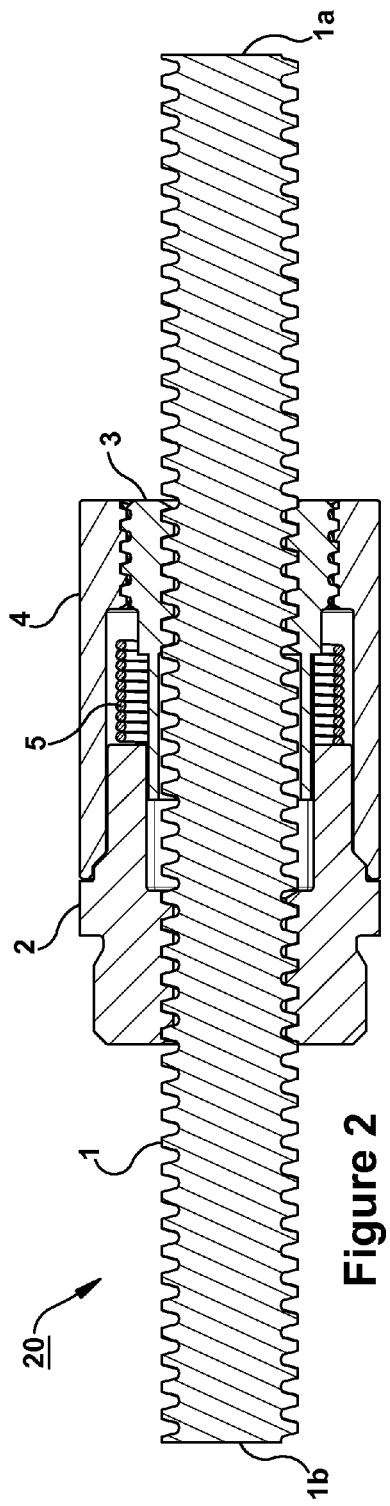
Figure 1
Figure 2

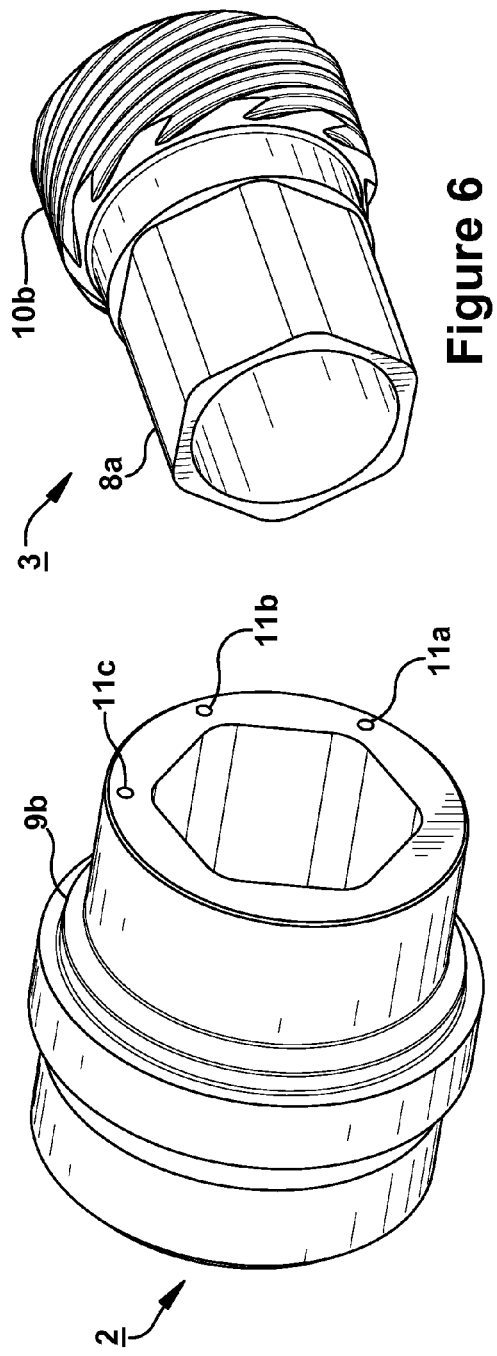
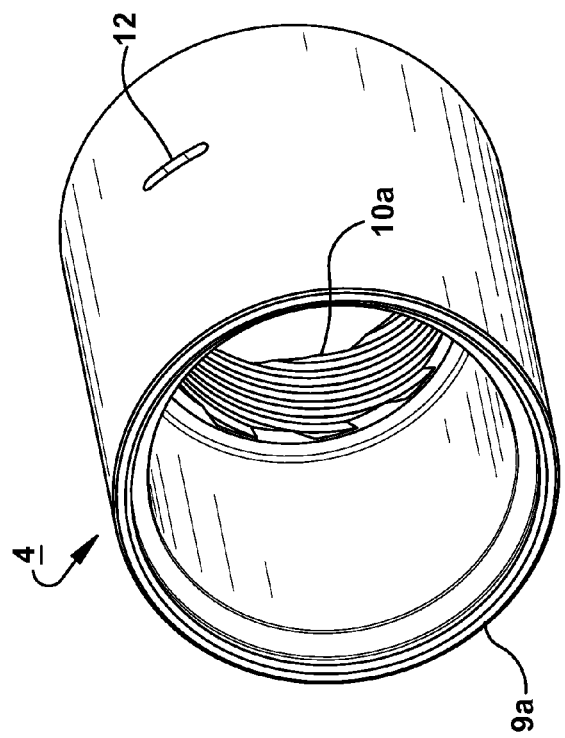

NO-LASH NUT ASSEMBLY

CROSS-REFERENCE TO RELATED APPLICATION

This application claims the benefit of U.S. Provisional Patent Application Ser. No. 61/508,749, entitled NO-LASH NUT ASSEMBLY and filed Jul. 18, 2011, the entire disclosure of which is incorporated herein by reference, to the extent that it is not conflicting with the present application.

BACKGROUND

Space or play between a threaded nut and a threaded screw is generally referred to as backlash. Nut and screw assemblies may have both radial and axial backlash between the threads for various reasons, such as for example, limitations in manufacturing. Further, additional backlash can be generated during the life of the assembly from wear caused by friction. In application of the assembly, backlash can cause many problems, such as for example, inefficiencies and positioning errors.

To compensate for or reduce the effects of backlash, various mechanisms have been developed. For example, two-piece threaded nuts for use with a threaded power screw are known in the art. One known strategy to eliminate axial and radial backlash in a two-piece nut assembly, while also compensating for the material wear, is to maintain a continuous internal force between two threaded nuts. A compression spring forcing two threaded nuts away from each other, creating a preload, has been used to eliminate backlash. Although the arrangement is both relatively easy to assemble and economical, the design presents several problems.

The force the compression spring puts onto the opposing nuts is typically relatively large. A large amount of axial force creates a significant drag torque which the mechanical device driving the power screw must overcome in operation. However, if the axial force is not relatively large, which would lower the drag torque, the load applied to the nut during its application may overcome the spring force. When the force of the compression spring is less than the force of the applied load, the preload becomes ineffective and the backlash is reintroduced.

SUMMARY OF THE INVENTION

According to an exemplary embodiment of the present invention, a no-lash nut assembly is arranged to compensate for axial backlash and radial backlash.

In one embodiment of the present invention, the assembly includes a no-lash nut assembly for installation on a threaded rod. The nut assembly includes a lead nut, a trailing nut, a transition nut and a torsion spring. The lead nut has a front face, a rear face, and a threaded bore for mating with the threaded rod. The trailing nut has a threaded bore for mating with the threaded rod, a front portion, and a rear portion. The front portion has an external surface configured for engagement with the lead nut to prohibit relative rotation and allow relative axial movement between the lead nut and the trailing nut. The rear portion has a threaded external surface. The transition nut has a threaded bore along a portion of its rear length for mating to the threaded external surface of the trailing nut, an external surface defining a slot, and a front face having a mating surface corresponding to the rear face of the lead nut and allowing relative axial movement between the lead nut and the transition nut. The torsion spring has a pin at a front end and a hook at a rear end. The pin protrudes into a hole in the rear face of the lead nut and the hook protrudes into the slot of the transition nut and applies a rotational force on the transition nut.

BRIEF DESCRIPTION OF THE DRAWINGS

Features and advantages of the invention will become apparent from the following detailed description made with reference to the accompanying drawings.

FIG. 1 is a rear perspective view of a nut assembly installed on a threaded rod;

FIG. 2 is a cross-sectional view of the nut assembly and treaded rod of FIG. 1, shown along the longitudinal axis of the nut assembly;

FIG. 5 is a rear perspective view of the lead nut of the nut assembly of FIG. 1;

FIG. 6 is a front perspective view of the trailing nut of the nut assembly of FIG. 1; and FIG. 7 is a front perspective view of the lead nut of the nut assembly of FIG. 1.

DETAILED DESCRIPTION

Figure 3:
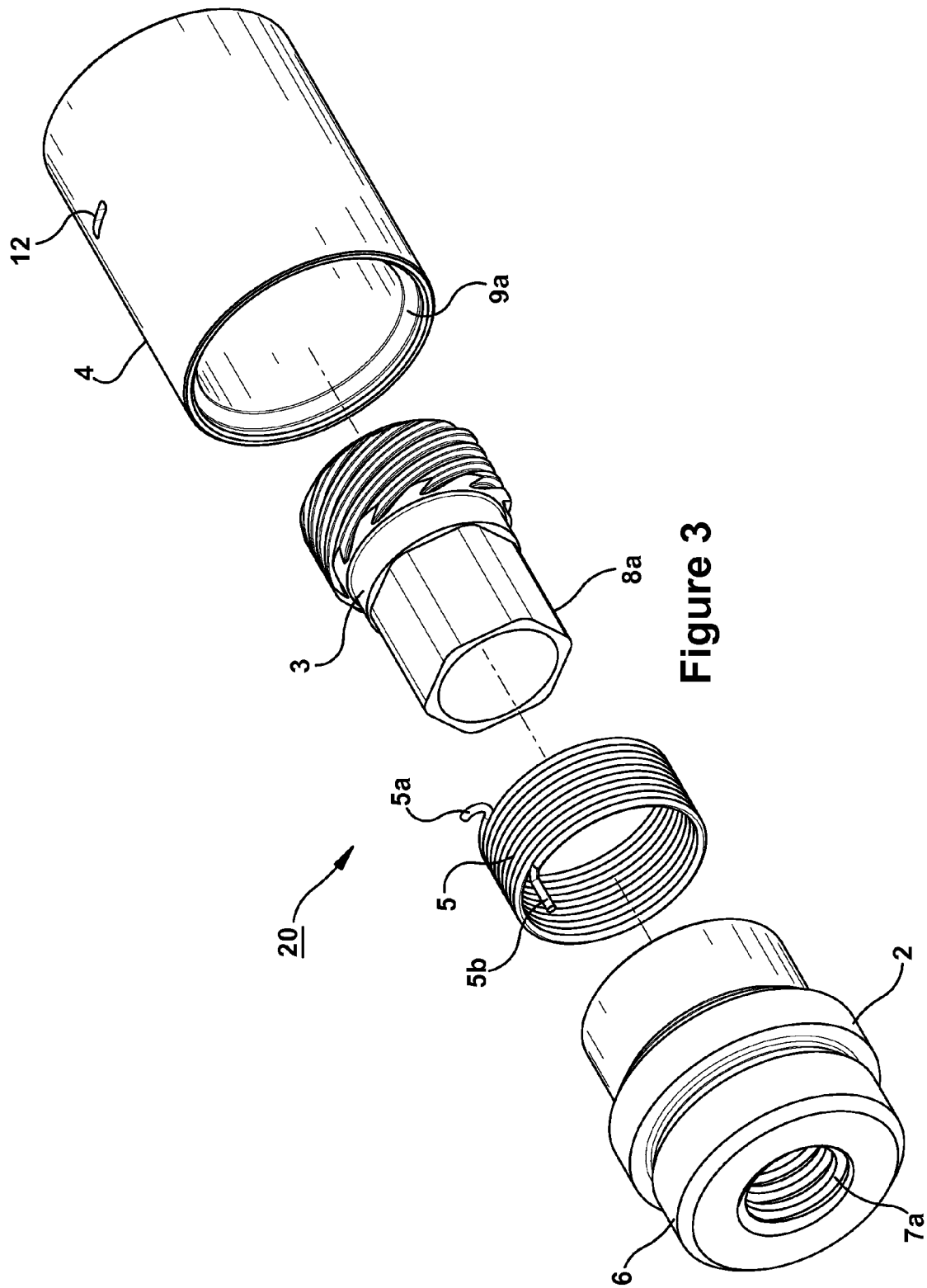
FIG. 3 is an exploded assembly right front view of the nut assembly of FIG. 1.

The Detailed Description merely describes preferred embodiments of the invention and is not intended to limit the scope of the invention in any way. Indeed, the invention as described by the specification is broader than and unlimited by the preferred embodiments, and the terms used have their full ordinary meaning.

Also, while the exemplary embodiments described in the specification and illustrated in the drawings relate to a no-lash assembly for a power screw, it should be understood that many of the inventive features described herein may be utilized in other applications. One exemplary assembly is an acme nut assembly, but other nut assemblies can be utilized in the practice of this invention.

The present invention is directed to a no-lash nut assembly. The assembly is arranged to prohibit axial backlash and radial backlash, maintain a low drag torque value, and automatically compensate for wear accumulated during service life. The term "no-lash" is used herein to describe an assembly that prohibits backlash, and is not intended to be interpreted as necessarily completely preventing and eliminating all backlash, either at initial assembly or during application. For example, an exemplary no-lash nut assembly includes a plurality of parts so that when assembled essentially no measurable backlash will exist. For example, the measureable backlash may be as low as 0.0001" or less. Further, the nut assembly will automatically adjust and compensate during the life of the assembly as wear accumulates due to the friction.

In one embodiment of the present invention, the assembly includes a threaded power screw, a first or lead nut, a second or trailing nut, a sleeve or transitional nut and a torsion spring. The lead nut and trailing nut, which are coupled to prohibit relative rotation between each other, each have matching threaded bores mating to the threaded power screw. The transition nut mates to the lead nut on an orbital surface and to the trailing nut via corresponding threads. The orbital surface provides a rigid mating surface while also maintaining concentricity of the overall assembly. A torsion spring is coupled to the back face of the lead nut and to the radial surface of the transition nut. By engaging the spring within the individual components of the assembly, the no-lash nut assembly is activated. Once activated, the assembly can then be assembled onto the threaded power screw and used for multiple industrial applications.

Figure 4:
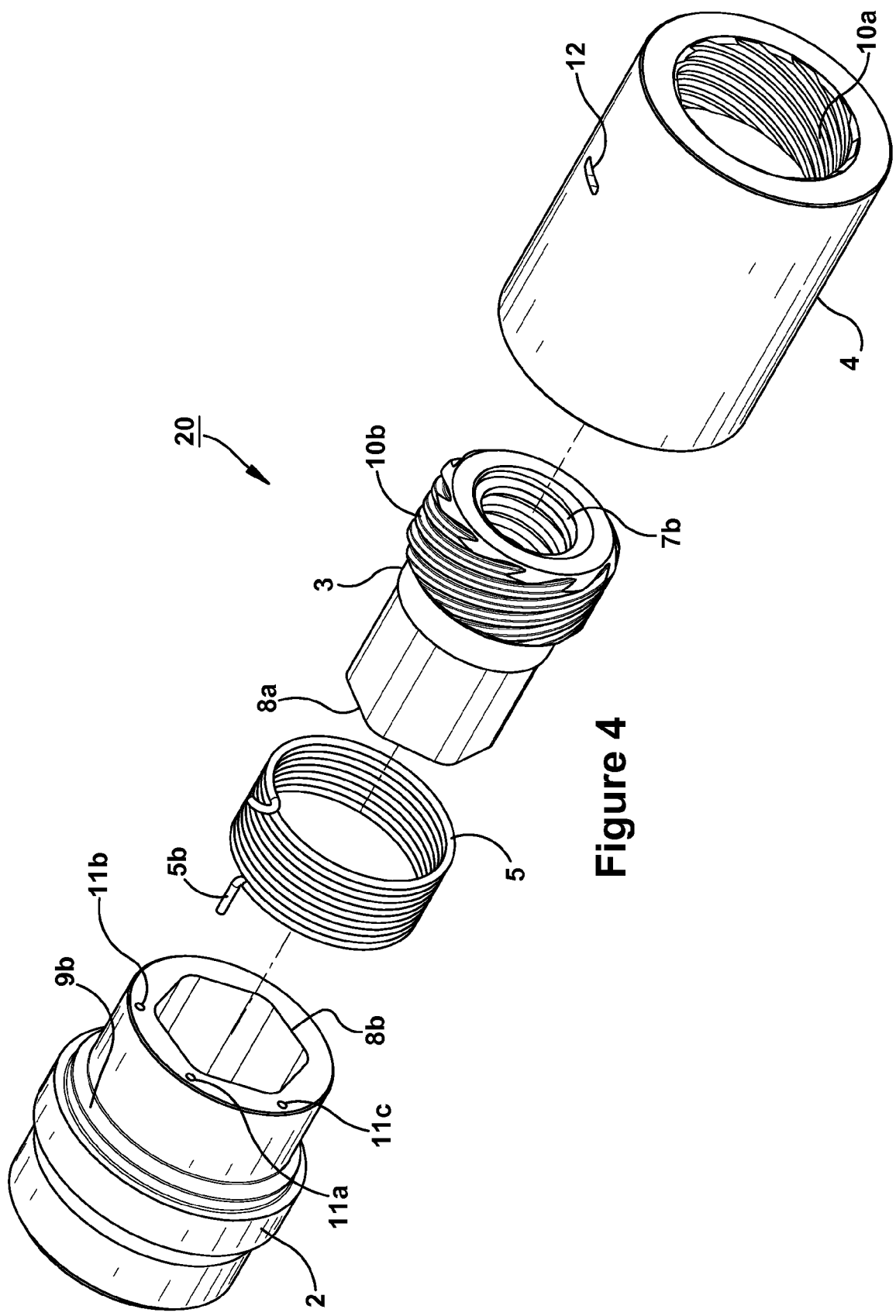
FIG. 4 is an exploded assembly left rear view of the nut assembly of FIG. 1.

Referring now to the drawings, FIG. 1 shows a rear perspective view of one embodiment of a nut assembly 20. A sectional view of the nut assembly 20 shown along the longitudinal axis is illustrated in FIG. 2. The nut assembly 20 includes a threaded power screw 1, a lead nut 2, a trailing nut 3, a transition nut 4, and a torsion spring 5. Exploded assembly right front and left front views of the nut assembly 20 are shown in FIGS. 3 and 4, respectively. When discussing the nut assembly or any of its components with reference to the Figures, the front portion is generally the left side of FIG. 1, or toward the lead nut 2, and the rear portion is generally the right side of FIG. 1, or toward the trailing nut 3. This arrangement is exemplary only and the invention can be practiced and applied with other arrangements.

Characteristics of the threaded power screw 1 will vary depending on the application. For example, the threaded screw 1 may be of various lengths up to the allowable manufactured length for particular diameter and can have standard or custom end machining. As seen in FIG. 2, the threaded power screw 1 extends from a first end 1a through the exemplary assembly 20 to a second end 1b. Threads on the exterior of the power screw 1 mate to the threaded bores 7a, 7b of the interior of the lead nut 2 and the trailing nut 3, respectively.

In most applications the nut 20 is fully assembled and preloaded and then is installed onto threaded power screw 1. After installation, the nut assembly 20 is removed from the threaded power screw 1 to either remove or increase the preload setting.

The lead nut 2 is shown on the left side of the assembly 20 in FIGS. 1 and 2, and alone in FIG. 5. To be discussed, the lead nut 2 is contiguous with the transition nut 4 at its outer diameter, and contiguous with the trailing nut 3 at its inner diameter. As shown, the lead nut 2 is configured, such as for example, by a concave, or v-thread 6, at the front face in which the applied external load can be fastened to during service. Alternatively, the lead nut 2 may have an integral flange at the front face. An interior bore 7a of the lead nut 2 is threaded to match the external threaded power screw 1.

The rear face of the lead nut 2 has an orbital surface 9b to mate to a matching orbital surface 9a on the transition nut 4 (see FIGS. 3 and 4). This orbital surface 9b maintains the concentricity between the outside diameter of the lead nut 2 and the transition nut 4. The orbital surface 9b also acts as a continuous rigid surface between the two parts 2, 4. The orbital surface 9b may also be a low friction surface to allow the transition nut 4 to easily rotate.

The lead nut 2 may be constructed from a low friction and long wear life material. The lead nut material is selected to provide an adequate amount of lubricity to maintain a low friction value and so that the nut assembly 20 remains relatively lightweight. Specifically, the lead nut may be constructed of a thermoplastic material, such as for example, Delrin AF. Delrin AF has PTFE material mixed with Delrin acetal resin. The PTFE gives the lubricity to the nut while the acetal resin maintains the strength of the nut.

The trailing nut 3 is disposed on the right side of the assembly 20 as shown in FIGS. 1 and 2 and along in FIG. 6. An interior bore of the trailing nut 3 is threaded along at least a portion of its length to match the threaded power screw 1. In the embodiment best shown in FIG. 2, the trailing nut 3 has a threaded bore 7b of an equivalent length to that of the threaded bore 7a of the lead nut 2. This arrangement of equivalent lengths contributes to the no-lash properties of the assembly, both axially and rotationally. As shown, the threaded bore extends inward from the first end 1a. The lead nut 2 and the trailing nut 3 will be coupled together by the mating connection of a six-sided polygon 8a, 8b to prevent relative rotation, but still allowing axial movement. Other mating configurations, such as for example, different shapes and orientations, are possible in the practice of this invention.

Similar to the lead nut 2, the trailing nut 3 may be constructed from a low friction and long wear life material. The trailing nut material is selected to provide an adequate amount of lubricity to maintain a low friction value and so that the nut assembly 20 remains relatively lightweight. Specifically, the trailing nut may be constructed of a thermoplastic material, such as for example, Delrin AF.

The transition nut 4 is disposed between the lead nut 2 and the trailing nut 3. As shown in FIG. 7 and to be discussed, the transition nut 4 has a smooth exterior surface and defines a slot 12. The transition nut 3 includes an internal stub acme thread 10a which mates to the external stub acme thread 10b of the trailing nut 3. An exemplary stub acme thread has a low profile that will use the minimal amount of diametric area on the overall diameter of the acme nut. This arrangement will minimize the overall outside diameter of the assembly 20. Further, the stub acme thread has a high helix and also a high lead so that a minimal adjustment on the rotation of the transition nut will result in the maximum axial movement of the trailing nut. The high helix angle will also maintain the minimal change in the preload torque applied to the nut assembly 20 via the torsion spring throughout the service life of the assembly.

The transition nut 4 may be constructed of a light weight, high strength material, such as for example, 6061-T6 Aluminum. An exemplary transition nut utilizes aluminum to maintain a low weight while also keeping high strength and non-corrosive properties. The non-magnetic property of aluminum is also advantageous for the assembly.

The torsion spring 5 includes a hook 5a at one end and a pin 5b at an opposing end. In the embodiment shown, the hook 5a protrudes in a direction perpendicular to the longitudinal axis of the assembly 20, while the pin 5b protrudes parallel to the longitudinal axis of the assembly 20. The torsion spring 5 is fixed between a drilled hole 11b on the backside of the lead nut 2 and the slot 12 in the radial surface of the transition nut 4. Specifically, the pin 5b is inserted into a drilled hole 11b. As shown in FIG. 4, the backside of the lead nut 2 may include more than one drilled hole. For example, the lead nut 2 may include three equally spaced holes 11a, 11b, 11c.

To put a load into the torsion spring 5, it must be wound into a counterclockwise direction. Once in a loaded condition, the torsion spring 5 will apply a clockwise rotational force on the transition nut 4. When a clockwise rotational force is applied to the transition nut 4, the internal right-hand acme thread forces the nose of the transition nut 4 against the rigid mating orbital surface 9b of the lead nut 2 and simultaneously axially moves the trailing nut 3 and the lead nut 2 in opposite directions.

The exemplary torsion spring shown is a right-hand wound spring. By modifying the mating threads 10a, 10b of the trailing nut 3 and the transition nut 4 to left-hand threads, the assembly 20 would allow a left-hand wound torsion spring 5 to be used.

An exemplary torsion spring 5 is constructed of a non-magnetic material, such as for example, AISI 304 stainless steel. As such, no magnetic materials are included within the assembly 20. The stainless steel also provides the spring with non-corrosive properties. The use of a non-magnetic and non-corrosive material permits the use of the no-lash nut assembly 20 in a wider variety of applications.

An exemplary method of nut assembly and set-up procedure will now be discussed. Any numbers, angles, dimensions, hardware, shapes, and classifications disclosed or referenced are for example only, and are not intended to limit the scope of the invention. To begin assembly of the no-lash nut assembly 20, the hook 5*a* of one end of the end of the torsion spring 5 is inserted into the cutout 12 on the radial body of the transition nut 4. The pin protrusion 5*b* at the opposite end of the torsion spring 5 is inserted into a drilled hole 11*a*, 11*b*, 11*c* on the back end of the lead nut 2.

The outer diameter stub acme threads 10*b* of the trailing nut 3 are engaged with the inner diameter stub acme threads 10*a* of the transition nut 4. This engagement must be done without engaging the matching extrusions 8*a*, 8*b* of the lead nut 2 and the trailing nut 3. The threaded connection 10*a*, 10*b* allows for precise control of this assembly step. Once in the desired position, the transition nut 4 is turned counterclockwise between 180 and 270 degrees. Again, the threaded connection 10*a*, 10*b* allows for precise control of this assembly step.

The method of assembly includes engaging the matching extrusions 8*a*, 8*b* on the lead nut 2 and the trailing nut 3 by simultaneously applying a clockwise turn and pushing the trailing nut 3 until the two nuts 2, 3 are coupled together. Once coupled, the transition nut 3 is turned counterclockwise, but not to exceed 360 degrees from the original position. Further, contact between the orbital mating surface of the lead nut and the transition nut is maintained. As the final counterclockwise turns are being applied, the trailing nut 3 will move axially toward the lead nut 2.

After assembly, the no-lash nut assembly 20 is installed onto the power screw 1 while maintaining the integrity of the load the torsion spring 5 puts onto the nut bodies 2, 3. The transition nut 4 may need to be slightly rotated so that the trailing nut 3 moves axially. In making this adjustment, the acme threads of the lead nut 2 and the trailing nut 3 will match onto the power screw 1.

The torsion spring 5 is loaded between 90 and 360 degrees to maintain consistency of the drag torque in the no-lash assembly 20. The measurements of drag torque of the assembly 20 will be based on the torsion spring angle.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed is:

1. A no-lash nut assembly for installation on a threaded rod, the nut assembly comprising:
    a lead nut having a front face, a rear face, and a threaded bore for mating with the threaded rod;
    a trailing nut having a trailing nut threaded bore for mating with the threaded rod, a front portion, and a rear portion, the front portion extending axially past and radially within the lead nut, the front portion having an external surface configured for engagement with the lead nut to prohibit relative rotation and allow relative axial movement between the lead nut and the trailing nut, and the rear portion having a threaded external surface;
    a transition nut having a transition nut threaded bore along a portion of its rear length for mating to the threaded external surface of the trailing nut, a transition nut external surface defining a slot, and a transition nut front face having a mating surface corresponding to the rear face of the lead nut and allowing relative axial movement between the lead nut and the transition nut; and
    a torsion spring having a pin at a front end and a hook at a rear end, the pin protruding into a hole in the rear most surface of the lead nut and the hook protruding into the slot of the transition nut and applying a rotational force on the transition nut.

2. The nut assembly of claim 1 wherein along a length of its outer surface the lead nut is contiguous with the transition nut and along a length of its internal surface the lead nut is contiguous with the trailing nut.

3. The nut assembly of claim 1 wherein rotation of the transition nut relative to the threaded rod forces the front face of the transition nut axially against the rear face of the lead nut and the trailing nut axially away from the lead nut.

4. The nut assembly of claim 1 wherein the rear face of the lead nut defines an orbital surface correspondingly shaped to an orbital surface on the front face of the transition nut.

5. The nut assembly of claim 4 wherein the engagement of the orbital surface of the lead nut to the orbital surface of the transition nut allows relative rotational movement between the lead nut and the transition nut.

6. The nut assembly of claim 1 wherein the lead nut is constructed of a thermoplastic.

7. The nut assembly of claim 1 wherein the trailing nut is constructed of a thermoplastic.

8. The nut assembly of claim 1 wherein the transition nut is constructed of aluminum.

9. The nut assembly of claim 1 wherein the torsion spring is constructed of stainless steel.

10. The nut assembly of claim 1 wherein each of the lead nut, the trailing nut, the transition nut and the torsion spring are constructed of non-magnetic components.

11. The nut assembly of claim 1 wherein the lead nut has a v-thread at the front face.

12. The nut assembly of claim 2 wherein the lead nut has an integral flange at the front face.

13. The nut assembly of claim 1 wherein the internal surface of the front portion of the trailing nut is a six-sided polygon.

14. The nut assembly of claim 1 wherein a length of the threaded bore of the lead nut is equal to a length of the threaded bore the trailing nut.

15. The nut assembly of claim 1 wherein the external threads of the trailing nut are stub acme threads.

16. The nut assembly of claim 1 wherein the internal threads of the transition nut are stub acme threads.

17. The nut assembly of claim 1 wherein the rear face of the lead nut defines a plurality of holes.

18. The nut assembly of claim 17 wherein the plurality of holes are equally spaced.

* * * * *